United States Patent [19]

Bojas et al.

[11] B 3,988,893
[45] Nov. 2, 1976

[54] HYDROSTATIC TRANSMISSION DRIVE SYSTEM

[75] Inventors: Edward J. Bojas; Harold R. Ward, both of Marshall, Mich.

[73] Assignee: Eaton Corporation, Cleveland, Ohio

[22] Filed: Sept. 26, 1973

[21] Appl. No.: 400,871

[44] Published under the second Trial Voluntary Protest Program on February 17, 1976 as document No. B 400,871.

Related U.S. Application Data

[63] Continuation-in-part of Ser. No. 248,685, April 28, 1972, Pat. No. 3,795,109.

[52] U.S. Cl. .................................. 60/445; 60/435; 60/466; 180/6.48
[51] Int. Cl.² ..................................... F16D 31/02
[58] Field of Search ............. 180/6.48; 60/445, 466, 60/435, 443, 444, 490; 74/664, 720, 720.5

[56] References Cited
UNITED STATES PATENTS

| | | | |
|---|---|---|---|
| 2,518,578 | 8/1950 | Tomlinson | 60/447 |
| 2,880,586 | 4/1959 | Lincoln | 60/447 |
| 3,234,856 | 2/1966 | Martin | 180/6.48 |
| 3,238,723 | 3/1966 | Young | 60/444 |
| 3,279,637 | 10/1966 | Olson et al. | 180/6.48 |
| 3,368,425 | 2/1968 | Lewis | 74/720 |
| 3,442,344 | 5/1969 | Ocule | 180/6.48 |
| 3,526,288 | 9/1970 | Cryder et al. | 60/447 |
| 3,650,107 | 3/1972 | Court | 60/443 |
| 3,727,402 | 4/1973 | Keith et al. | 60/444 |
| 3,795,109 | 3/1974 | Bojas et al. | 60/490 |

*Primary Examiner*—Samuel Scott
*Assistant Examiner*—Wesley S. Ratliff, Jr.
*Attorney, Agent, or Firm*—Teagno & Toddy

[57] ABSTRACT

An improved drive system includes a pair of hydrostatic transmissions which are driven by a common engine or prime mover and are drivingly connected with different tracks of a vehicle. The input to output speed ratios of the hydrostatic transmissions are simultaneously varied by operating a single speed control valve to port control fluid pressure to pressure responsive secondary or control motors in pump and motor actuators of the hydrostatic transmissions. A pair of charge pumps are provided to charge the hydrostatic transmissions and provide control fluid. If the fluid pressure output of either of the charge pumps falls below a predetermined level, a control arrangement reduces the control fluid pressure transmitted to the pump and motor actuators by the speed control valve to deswash or destroke both of the transmissions. The control arrangement also short circuits the hydrostatic loops interconnecting the pump and motor units. In addition, the brakes of the vehicle are engaged to stop the vehicle. When the vehicle is to be stopped during normal operation, actuation of the brakes causes the control arrangement to effect a deswashing of the pump and motor units and a short circuiting of the hydrostatic loops.

32 Claims, 6 Drawing Figures

HYDROSTATIC TRANSMISSION DRIVE SYSTEM

BACKGROUND OF THE INVENTION

This application is a continuation-in-part of copending U.S. application Ser. No. 248,685, filed Apr. 28, 1972, and entitled "Hydrostatic Transmission Drive System" now issued as U.S. Pat. No. 3,795,109.

This invention relates generally to a hydrostatic transmission drive system.

Hydrostatic transmissions are commonly used to vary the drive ratio between an engine or other prime mover and the tracks or wheels of a vehicle. These hydrostatic transmissions may include variable displacement pump and motor units. A control system is actuated by an operator to selectively vary the input to output speed ratio of the hydrostatic transmission. One known control system for varying the input to output speed ratio of a hydrostatic transmission is disclosed in U.S. Pat. No. 3,543,515 and includes a valve assembly which varies the pressure of fluid conducted to control motors to effect a variation in the displacement of pump and motor units of a hydrostatic transmission. Although the drive system disclosed in this patent includes only a single hydrostatic transmission, a pair of hydrostatic transmissions have been utilized in vehicles having two tracks so that one transmission can be associated with each of the tracks. Drive systems including a pair of hydrostatic transmissions are disclosed in U.S. Pat. No. 3,528,243 and in Keith et al application Ser. No. 158,455, filed June 30, 1971, for "Hydrostatic Transmission Speed and Steering Control System" now issued as U.S. Pat. No. 3,727,402.

SUMMARY OF THE PRESENT INVENTION

The present invention relates to apparatus for use in connection with a hydrostatic transmission drive system. More specifically, the present invention includes an improved charge pump arrangement for charging the hydrostatic transmissions and providing control fluid under pressure. This improved charge pump arrangement includes two charge pumps which are capable of quickly charging the hydrostatic transmissions during cold weather. Upon a failure of the charge pressure, the transmissions are deswashed and their hydrostatic loops are short circuited. In addition, the vehicle brakes are engaged.

When the vehicle brakes are engaged during normal operation of the vehicle, the hydrostatic transmissions are deswashed. In addition, the hydrostatic loops are short circuited to compensate for any difference in the rate at which the transmissions are destroked and to prevent unnecessary brake wear.

Accordingly, it is an object of this invention to provide a new and improved apparatus for controlling the operation of a pair of hydrostatic transmissions wherein the apparatus includes two charge pumps for charging the hydrostatic transmissions and providing control fluid.

Another object of this invention is to provide a new and improved apparatus as set forth in the next preceding object and wherein upon failure of pressure from either one of the charge pumps, the hydrostatic transmissions are destroked, dumped, and the brakes of an associated vehicle are set.

Another object of this invention is to provide a new and improved apparatus for controlling the operation of a plurality of hydrostatic transmissions wherein the transmissions are destroked and dumped upon actuation of the brakes of an associated vehicle.

DESCRIPTION OF THE DRAWINGS

The foregoing and other objects and features of the invention will become more apparent upon a consideration of the following description taken in connection with the accompanying drawings wherein.

DESCRIPTION OF ONE PREFERRED EMBODIMENT

General Description

Figure 1:
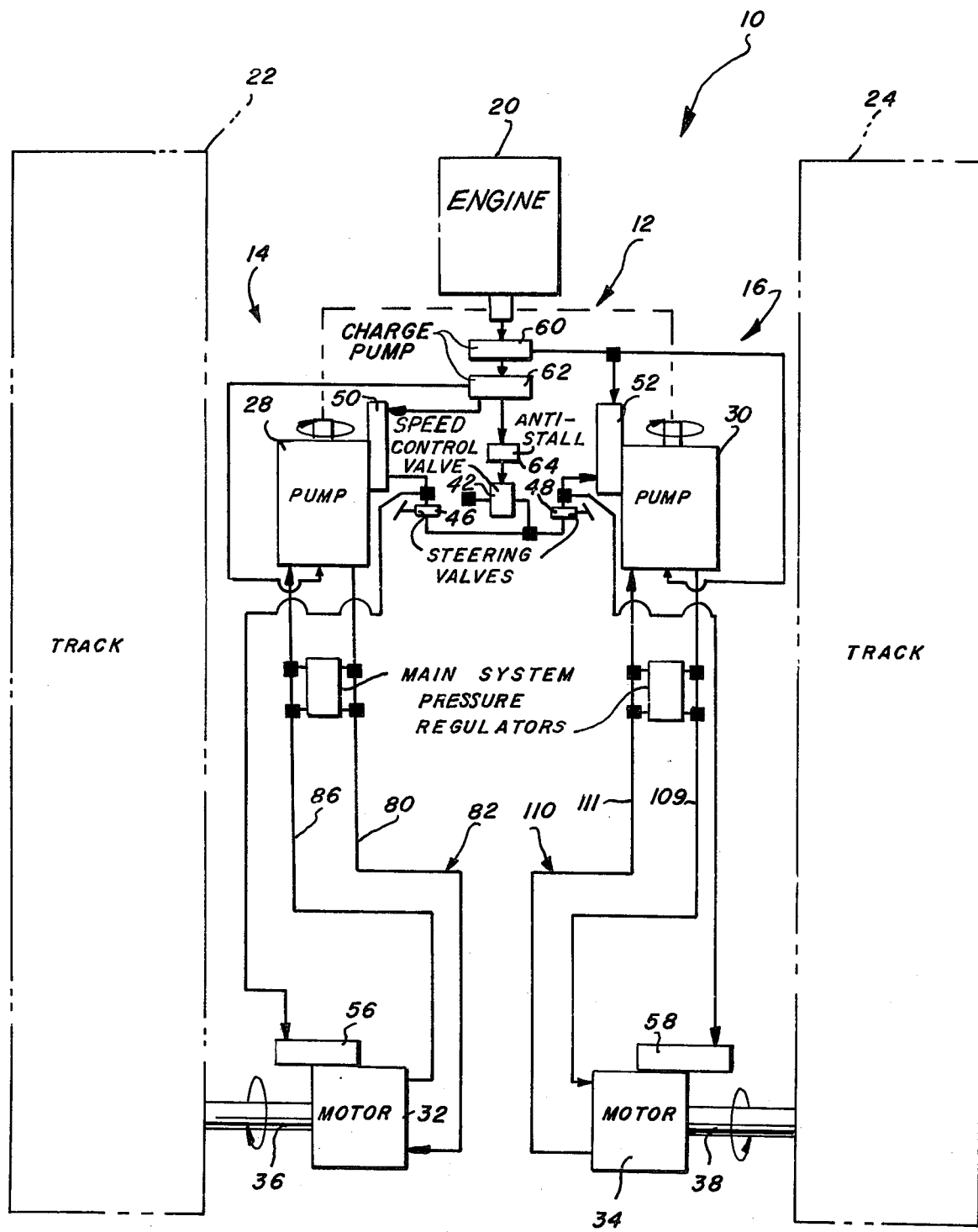
FIG. 1 is a schematic illustration of a tracked vehicle having a hydrostatic transmission drive system constructed in accordance with the present invention.

A vehicle 10 having a hydrostatic transmission drive system 12 constructed in accordance with the present invention is illustrated in FIG. 1. The hydrostatic transmission drive system 12 includes left and right hand hydrostatic transmissions 14 and 16 which transmit drive forces from a common engine or prime mover 20 to left and right tracks 22 and 24 of the vehicle 10. The hydrostatic transmissions 14 and 16 include variable displacement pump units 28 and 30 which are driven by the engine 20 to transmit fluid under pressure to variable displacement motor units 32 and 34 which are drivingly connected with the tracks 22 and 24 by drive shafts 36 and 38.

When the vehicle 10 is being driven along a straight path, the input and output speed ratios of the hydrostatic transmissions 14 and 16 are simultaneously changed by equal amounts upon operation of a speed control or pressure regulator valve 42 which is connected with the hydrostatic transmissions through steering control valves 46 and 48. Assuming that the vehicle 10 is moving forwardly along a straight path at a relatively slow speed, the speed control valve 42 can be operated to increase the control fluid pressure transmitted through the steering valves 46 and 48 to pressure responsive pump actuator assemblies 50 and 52. The increase in control fluid pressure activates the pump actuator assemblies 50 and 52 to increase the effective displacement of the pump units 28 and 30 by equal amounts and thereby increase the forward speed at which the tracks 22 and 24 are driven. If the speed control valve 42 is operated to a sufficient extent, motor actuator assemblies 56 and 58 will decrease the effective displacement of the associated motor units 32 and 34 by equal amounts to further increase the speed at which the tracks 22 and 24 are driven.

If it is desired to turn the vehicle 10 toward either the left or the right, one of the steering control valves 46 or 48 is actuated to reduce the output speed of the hydrostatic transmission 14 or 16 connected with the track 22 or 24 on the side toward which the vehicle is to turn. Thus, if the vehicle is to be turned toward the left, the steering control valve 46 is actuated to reduce the output speed of the hydrostatic transmission 14 and the speed of movement of the track 22 relative to the hydrostatic transmission 16 and track 24. Similarly, if the vehicle is to be turned toward the right, the steering control valve 48 is actuated to reduce the output speed of the hydrostatic transmission 16 and the speed of the track 24.

In accordance with a feature of the present invention, a pair of charge pumps 60 and 62 are driven by the engine 20 to provide fluid to charge the hydrostatic transmissions 14 and 16. Since the two charge pumps 60 and 62 have a relatively large capacity, the two transmissions are quickly charged upon starting of the vehicle 10. This is particularly advantageous when the vehicle is being started in cold weather.

Control fluid is supplied to the speed control valve 42 from the charge pump 62 (FIG. 1) through an anti-stall system 64. In the event of an impending overloading of the engine 20, the anti-stall system 64 effects a reduction in the pressure of the control fluid conducted to the speed control valve 42. This results in a reduction in the pressure of the control fluid ported to the pump and motor actuator assemblies 50, 52, 56 and 58 of the hydrostatic transmissions 14 and 16 to effect a corresponding reduction in the output speeds of the hydrostatic transmissions. Although many different types of anti-stall systems could be utilized, it is preferred to use the anti-stall system disclosed in U.S. application Ser. No. 356,720 filed May 3, 1973, and by Harold R. Ward and entitled "Hydrostatic Transmission Anti-Stall System." The disclosure in the aforesaid Ward application Ser. No. 356,720 is to be considered as being incorporated herein in its entirety by this reference thereto.

The pump unit 28 of the left hand transmission 14 is of the axial piston type (see FIG. 2) and has a swashplate 70 which is moved by the actuator assembly 50 to vary the output of the pump unit in a known manner. The pump unit includes a rotary barrel 74 fixedly connected to an engine driven drive shaft 76. When the swashplate 70 is pivoted in a clockwise direction from the neutral position extending perpendicular to the axis of the shaft 76 to the forward actuated position shown in FIG. 2, high pressure fluid flows through a conduit 80 of the hydrostatic loop 82 to the motor unit 32. Low pressure fluid flows from the motor 32 through a conduit 86 of the hydrostatic loop 82 to the pump unit 28. The rate at which fluid flows through the high pressure conduit 80 is increased as the swashplate 70 is moved further from the neutral position toward the fully actuated position of FIG. 2.

When the swashplate 70 of the pump unit 28 reaches the fully actuated position, the rotational speed of the output shaft 36 is increased, while the engine operating speed remains constant by decreasing the displacement of the motor unit 32. To effect a decrease in the displacement of the motor unit 32, a swashplate 90 of the motor unit 32 is pivoted in a counterclockwise direction (as viewed in FIG. 2) by the motor actuator assembly 56 until the swashplate approaches, but does not reach, a vertical position (as viewed in FIG. 2). This movement of the swashplate 90 decreases the effective displacement of the motor unit 32 so that a barrel or body 94 to which the output shaft 36 is fixedly connected is rotated through a complete revolution under the influence of a relatively small volume of fluid conducted from the pump unit 28 through the conduit 80 to the motor unit 32.

Figure 2:
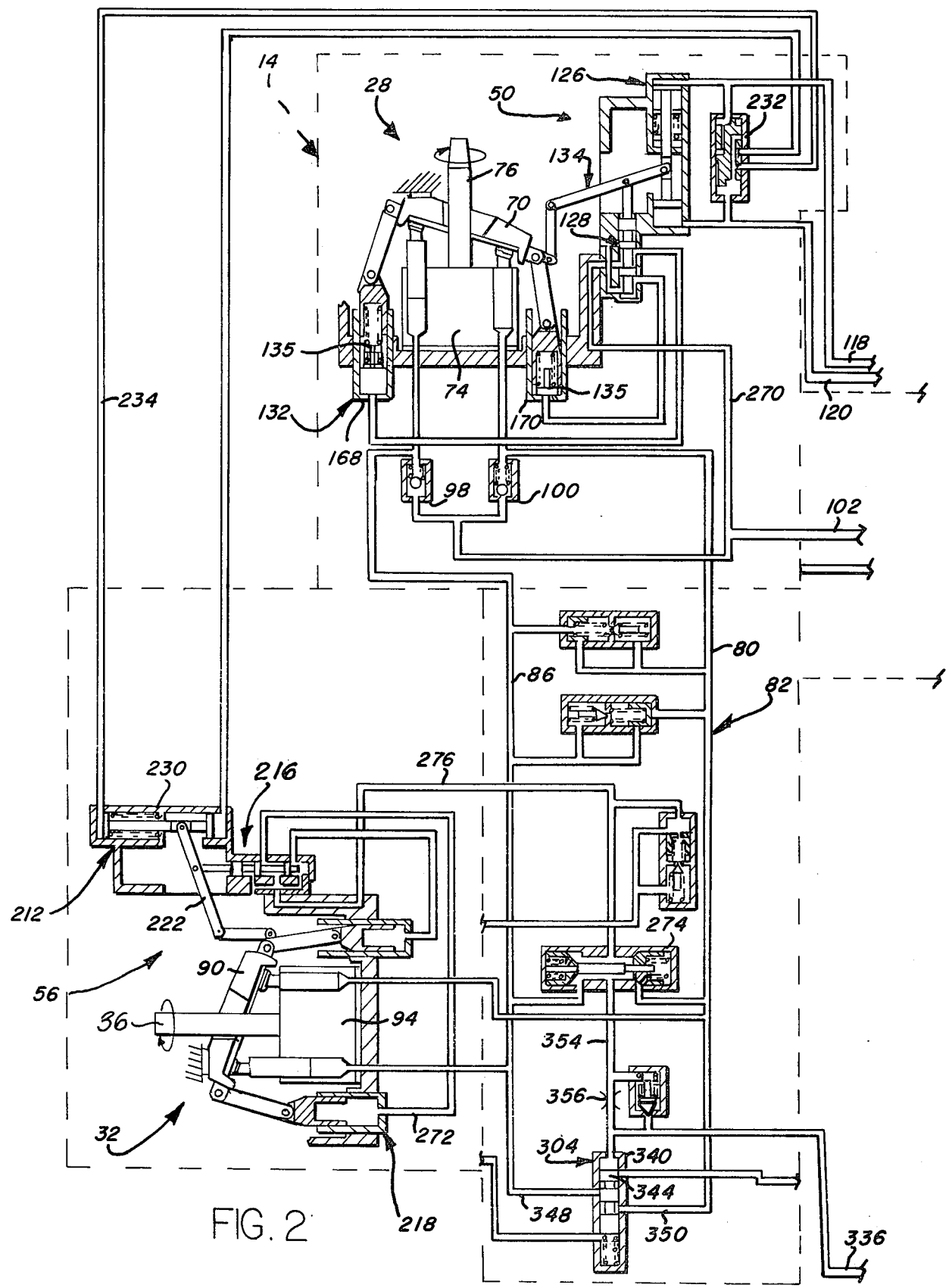
FIG. 2 is a schematic illustration of a hydrostatic transmission utilized to drive a left track of the vehicle of FIG. 1.

The direction of rotation of the output shaft 36 of the motor unit 32 can be reversed, without reversing the direction in which the engine 12 drives the input shaft 76 to the pump unit 28, by pivoting the swashplate 70 of the pump unit 28 in a counterclockwise direction from the neutral position. When the swashplate 70 is pivoted in a counterclockwise direction from the neutral position, the pump unit 28 forces fluid under pressure through the conduit 86 to thereby reverse the direction of operation of the motor unit 32. Of course during reverse operation of the pump unit 28, the conduit 80 conducts low pressure fluid from the motor unit 32 back to the pump unit 28. During operation of the pump unit 28 in either the forward or the reverse direction, makeup fluid is supplied from the engine driven charge pump 62 to the low pressure conduit 80 or 86 of the hydrostatic loop 82 through check valves 98 and 100 (FIG. 2). The check valves 98 and 100 are connected with the charge pump through conduits 102 and 103.

The right hydrostatic transmission 16 (FIGS. 1 and 3) is of the same construction as the left hydrostatic transmission 14 and cooperates with the speed control valve 42 in the same manner as does the left hydrostatic transmission. Thus, the pump and motor actuator assemblies 52 and 58 are activated in response to actuation of the speed control valve 42 to move pump and motor swashplates in the same manner as in which the swashplates 70 and 90 are moved by the pump and motor actuator assemblies 50 and 56.

When the swashplate of the pump unit 30 is pivoted to a forward actuated position (shown in FIG. 3) high pressure fluid flows through a conduit 109 of the hydrostatic loop 110 to the motor unit 34. Relatively low pressure fluid flows from the motor unit 34 through the conduit 111 to the pump unit 30. During forward operation of the hydrostatic transmission 16, the charge pump 60 supplies makeup fluid to the low pressure conduit 111 through a check valve 112. Similarly, when the hydrostatic transmission 16 is being operated in a reverse direction, the charge pump 60 supplies makeup or charge fluid to the then low pressure conduit 109 through the check valve 113.

Pump and Motor Actuator Assemblies

The pump actuator assembly 50 moves the swashplate 70 of the pump unit 28 in response to changes in control fluid pressure conducted through conduits 114 and 116 (FIG. 4) to the steering control valve 46 and from the steering control valve 46 through conduits 118 and 120 to a pressure responsive control or secondary motor 126 (FIG. 2) in the pump actuator assembly 50. Operation of the control motor 126 actuates a pilot valve 128 to port fluid from the charge pump 62 to a swashplate or primary motor 132. A floating link type feedback assembly 134 interconnects the swashplate 70, pilot valve 128, and control motor 126 and closes the pilot valve when the swashplate motor 132 has moved the swashplate through a distance corresponding to the extent of operation of the control motor.

When speed control valve 42 is in its neutral condition, the swashplate 70 of the pump unit 28 is moved to the neutral position by biasing springs 135 in the swashplate motor 132. The pump unit 28 is then in the destroked or deswashed condition and has substantially zero effective displacement. Rotation of the input shaft 76 by the engine or prime mover 20 with pump unit 28 destroked is ineffective to cause the transmittal of high pressure fluid from the pump unit to the motor unit 32 so that the left track 22 is not driven.

Figure 4:
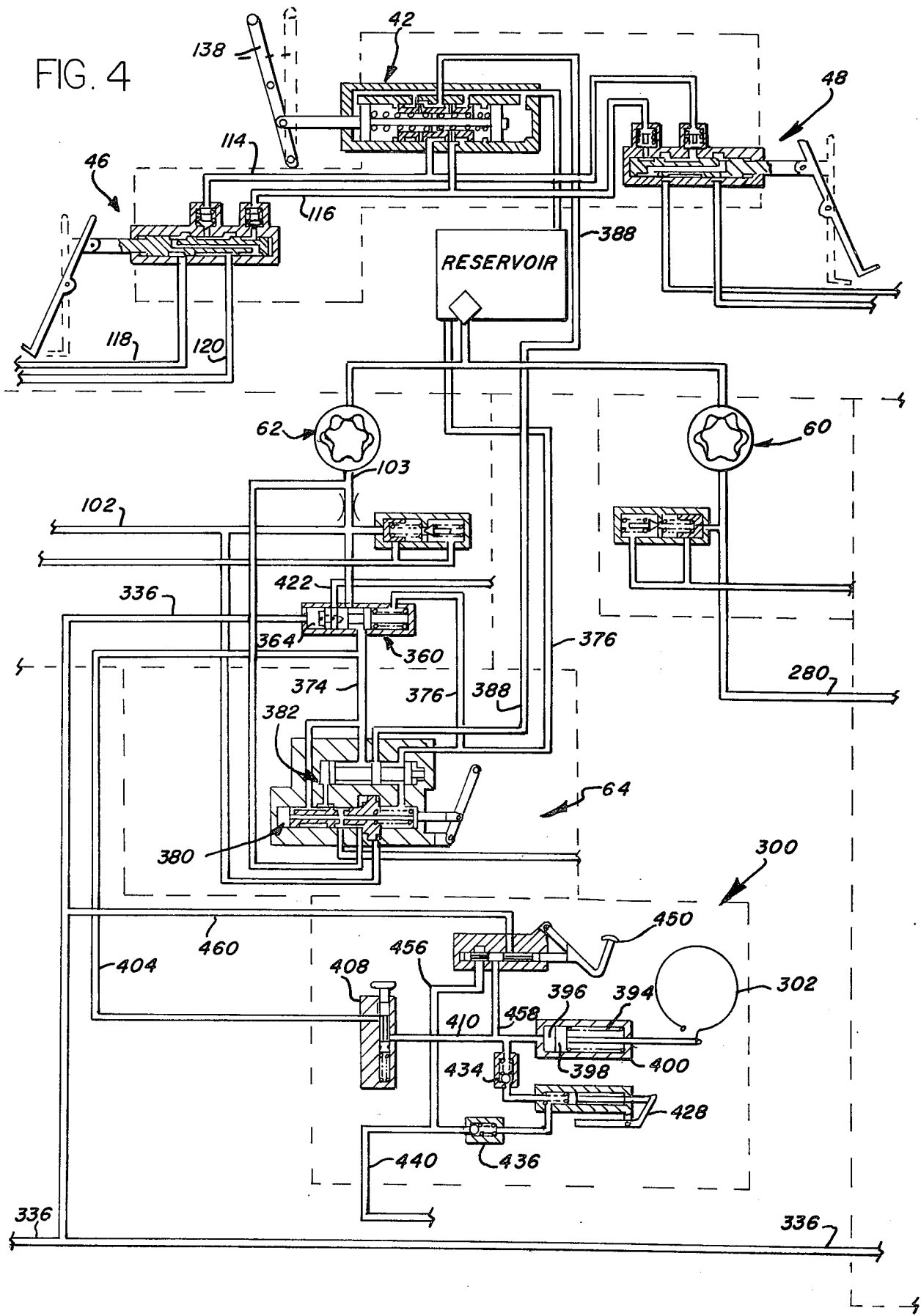
FIG. 4 is a schematic illustration of a control apparatus utilized in association with the hydrostatic transmissions of FIGS. 2 and 3.

When it is desired to move the vehicle 10 forwardly, the speed control valve 42 is operated in a forward direction by moving a control handle 138 from the neutral position shown in dashed lines in FIG. 4 to a forward actuated position shown in solid lines in FIG. 4. This movement of the control handle 138 ports high pressure control fluid through the conduit 114 to the steering valve 46 and from the steering valve 46 through the conduit 120 to the secondary or control motor 126. The high pressure control fluid operates the motor 126 against the influence of a spring assembly. As the secondary motor 126 is operated, the pilot valve 128 is moved from a neutral position connecting both cylinders of the swashplate motor 132 to drain to an actuated position. when actuated, the pilot valve 128 ports fluid to one cylinder 168 of the swashplate motor 132 and connects another cylinder 170 of the swashplate motor with drain. Of course, the fluid pressure in the cylinder 168 effects operation of the swashplate motor 132 to pivot the swashplate 70 in a clockwise direction to effect operation of the hydrostatic transmission 14 in a forward direction.

When the swashplate 70 has been moved by the swashplate motor 132 to an extent corresponding to the extent of operation of the control valve 42 from an initial condition, the feedback linkage 134 operates the pilot valve 128 to a null condition blocking fluid flow to and from the cylinder 168 to interrupt further operation of the swashplate motor 132 and movement of the swashplate. When the pilot valve 128 is in its null position, the displacement of the pump unit 28 is maintained constant.

If the control handle 138 (FIG. 4) of the speed control valve 42 is moved through a relatively large distance in the forward direction from the initial or neutral position, a relatively large change is made in the output speed of the hydrostatic transmission 14. To effect this relatively large change it may be necessary to increase the rotational speed of the output shaft 36 in a forward direction to a greater extent than can be accomplished by moving only the swashplate 70 of the pump unit 28. Therefore, after the swashplate 70 of the pump unit 28 has moved to the fully actuated position of FIG. 2, the swashplate 90 of the motor unit 32 is pivoted in a counterclockwise direction from the condition of FIG. 2 by the motor actuator assembly 56 to decrease the effective displacement of the motor unit. Decreasing the effective displacement of the motor unit 32 results in a corresponding increase in the output speed of the hydrostatic transmission 14.

The motor actuator assembly 56 includes a pressure responsive single action secondary or control motor 212 which is operated to actuate a pilot valve 216 from its null position to port fluid from the charge pump 62 to a swashplate motor 218. Operation of the swashplate motor 218 pivots the swashplate 90 in a counterclockwise direction from the maximum displacement position of FIG. 2 toward a minimum displacement position. As the swashplate 90 is moved, a feedback linkage 222 operates the pilot valve 216 back toward its null position. When the swashplate motor 218 has been operated to move the swashplate 90 to an extent which is related to the extent of operation of the secondary or control motor 212, the feedback linkage 222 returns the pilot valve 216 to its null position to interrupt movement of the swashplate.

The secondary motor 212 in the motor actuator assembly 56 is biased toward the unactuated position of FIG. 2 by a relatively strong spring assembly 230 so that the motor actuator assembly 56 remains in the unactuated position of FIG. 2 until the pump actuator assembly 50 has been operated to the fully actuated position, also shown in FIG. 2. When the control handle 138 for the speed or pressure controller valve 42 is moved in the forward direction through a relatively large distance from the neutral position, the pressure conducted through the conduit 120 operates the secondary motor 126 in the pump actuator assembly 50 to the fully actuated position of FIG. 2 against the influence of the relatively weak biasing spring. The control fluid pressure in the fluid conduit 120 is ported by a selector valve 232 through a conduit 234 leading to the control motor 212 of the motor actuator assembly 56. Since the biasing spring 230 is relatively strong, the control motor 212 remains inactive until after the control motor 126 in the pump actuator assembly 50 reaches the fully actuated condition of FIG. 2.

Accordingly, when the pump unit 28 has been operated to a fully swashed or stroked condition by operation of the secondary or control motor 126 and swashplate motor 132, the fluid pressure in the conduit 234 is sufficient to activate the secondary motor 212 in the motor actuator assembly 56. This causes the pilot valve 216 to be operated to port fluid under pressure to swashplate motors 218 to effect movement of the swashplate 90 of the motor unit 56 to an actuated condition. If the position of the speed control lever 138 is varied, the fluid pressure conducted from the speed control valve 42 to the pump and motor units 50 and 56 is varied with a resulting variation in the output speed of the hydrostatic transmission 14. When the control handle 138 is moved back toward the neutral position (illustrated in dashed lines in FIG. 4) the fluid pressure connected to the secondary motor 212 is reduced to actuate the pilot valve 216 to move the swashplate 90 back toward the maximum displacement condition shown in FIG. 2.

When the control lever 138 for the speed control valve 42 is moved in a reverse direction from the neutral position, that is in a clockwise direction from the dashed line position of FIG. 4, the conduit 114 is connected with drain and control fluid pressure is conducted to the pump actuator assembly 50 through the conduits 116 and 118. This results in the doubleacting pressure responsive secondary motor 126 being operated to actuate the feedback linkage 134 and pilot valve 128 to connect the power cylinder 168 of the swashplate motor 132 with drain. Simultaneously therewith the power cylinder 170 of the swashplate motor 132 is connected in fluid communication with the charge pump 62. This effects operation of the swashplate motor 132 to swing the swashplate 70 in a counterclockwise direction from the illustrated/forward position. High pressure fluid is then conducted through the conduit 86 to the motor unit 32 to drive the motor 32 in the reverse direction. Of course the further the speed control valve 42 is actuated in the reverse direction the greater is the control fluid pressure ported to the pump actuator 50 and the greater the speed at which the motor unit drives the output member 36.

When swashplate 70 reaches its maximum reverse displacement position, the motor actuator assembly 56 is actuated to reduce the effective displacement of the motor unit 32. Since the swashplate 90 of the motor unit 32 is always pivoted in a counterclockwise direction from the fully swashed position illustrated in FIG. 2, the secondary motor 212 in the motor actuator assembly 56 is a single acting motor which is operated in the same direction whether the output speed of the motor unit 32 is to be increased in the forward or the reverse direction. Thus, the increase in fluid pressure in the conduit 118 is ported by the selector valve 232 to the conduit 234 to activate the motor actuator assembly 56 in the manner previously explained.

The pump actuator assembly 52 for the right hydrostatic transmission 16 includes a secondary motor 250 (FIG. 3) which is connected with the speed control valve 42 through the steering valve 48 in the same manner as in which the secondary motor 126 of the pump actuator assembly 50 is connected with the speed control valve 42 through the steering valve 46. The pump actuator assembly 52, like the pump actuator assembly 50, includes a pilot valve 252 (FIG. 3) which is operated by an associated pressure responsive secondary or control motor 250 to effect operation of a swashplate motor and thereby vary the displacement of the pump unit 30. A feedback linkage 254, similar to the feedback linkage 134, is provided between the swashplate of the pump unit 30 and the associated pilot valve and secondary motor.

A selector valve 260, similar to the selector valve 232, directs control fluid pressure to a single action pressure responsive secondary motor 262 (FIG. 3) in the motor actuator assembly 58 during either forward or reverse operation of the hydrostatic transmission 16 in the same manner as in which the selector valve 232 ports control fluid pressure to the motor actuator assembly 56 of the hydrostatic transmission 14. In addition to a secondary motor 262, the motor actuator assembly 58 includes a pilot valve 264 which is operated by the secondary motor to port fluid to a swashplate motor 266, similar to the swashplate motor 218, to vary the effective displacement of the motor unit 34. The mode of operation of the pump and motor actuator assemblies 50 and 56 for the left hydrostatic transmission 14 and the mode of operation of the pump and motor actuator assemblies 52 and 58 for the right hydrostatic transmission 16 are the same as is set forth in U.S. Pat. application Ser. No. 248,685 filed Apr. 28, 1972, by Edward J. Bojas and Harold R. Ward and entitled "Hydrostatic Transmission Drive System" now issued as U.S. Pat. No. 3,795,109.

Charge Pumps and Related Controls

Figure 3:
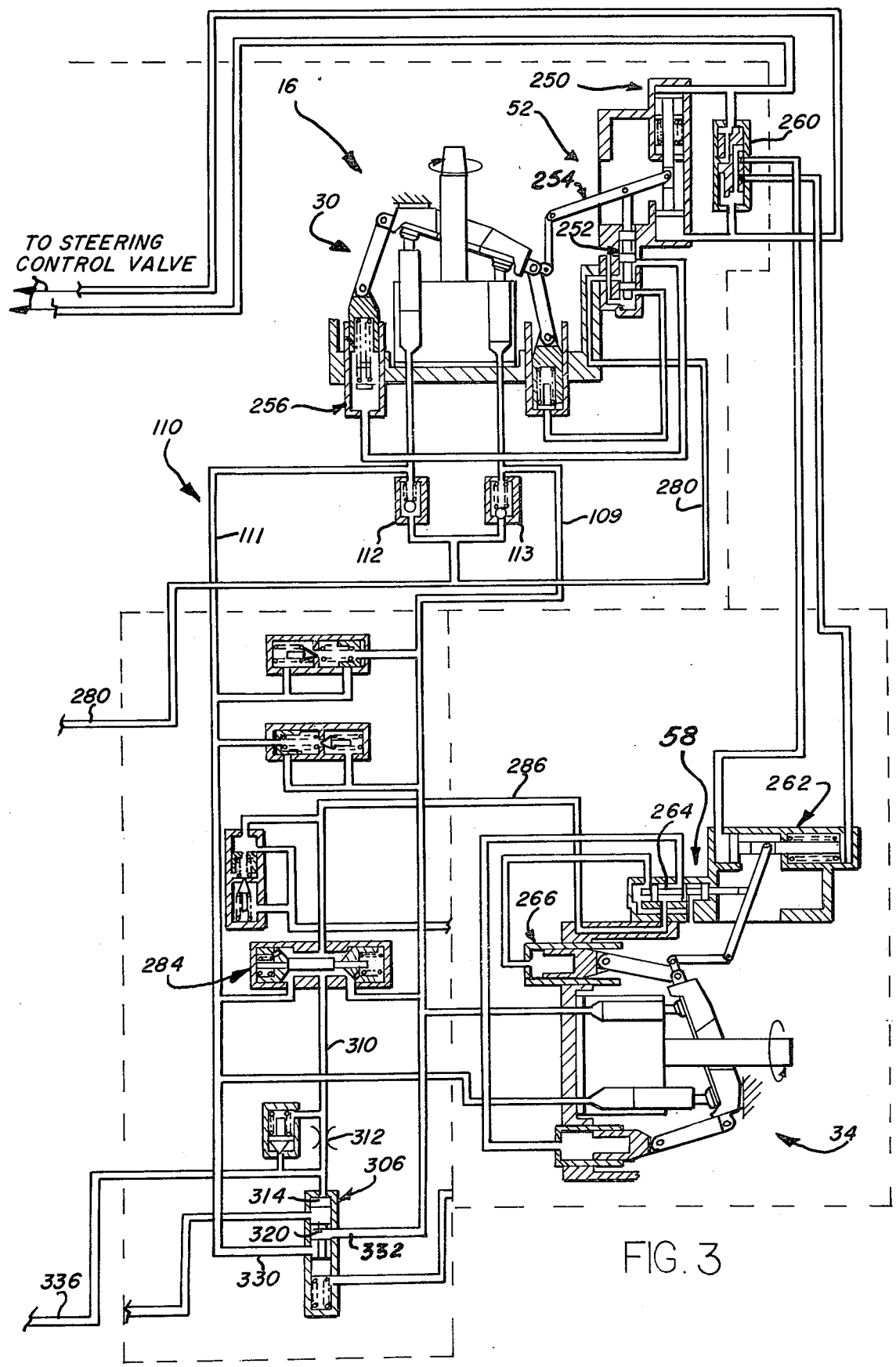
FIG. 3 is a schematic illustration of a hydrostatic transmission utilized to drive a right track of the vehicle of FIG. 1.

The charge pump 60 is effective to supply fluid to the controls and hydrostatic loop of the right hydrostatic transmission 16 while the charge pump 62 is effective to supply fluid to the controls and hydrostatic loop of the left hydrostatic transmission 14. In addition, the charge pump 62 supplies the speed control valve 42 with fluid. Thus, the pilot valve 128 in the pump actuator assembly 50 for the left hydrostatic transmission 14 is supplied with fluid from the charge pump 62 through conduits 102 and 270 (FIG. 3).

The pilot valve 216 (FIG. 2) of the motor actuator assembly 56 for the left hydrostatic transmission 14 is supplied with fluid from the charge pump 62 (FIG. 4) through the low pressure line of the hydrostatic loop 82. During forward operation of the hydrostatic transmission 14, a shuttle valve 274 (FIG. 2) ports fluid under pressure from the low pressure conduit 86 to a conduit 276 connected with the pilot valve 216 in the motor actuator assembly 56. Similarly, during reverse operation of the hydrostatic transmission 14, the shuttle valve 274 ports fluid under pressure from the then low pressure conduit 80 to the conduit 276 and pilot valve 216. The charge pump 62 supplies the speed control valve 42 with fluid under pressure through the anit-stall valve assembly 64.

The pilot valve 252 (FIG. 3) in the pump actuator assembly 52 for the right hydrostatic transmission 16 is connected with the charge pump 60 (FIG. 4) through a conduit 280. The conduit 280 is also effective to conduct fluid from the charge pump 60 to the check valves 112 and 113 (FIG. 3) and the low pressure side of the hydrostatic loop 110. The pilot valve 264 in the actuator assembly 58 for the motor unit 34 is connected with the charge pump 60 through a shuttle valve 284 which connects the low pressure conduit of the hydrostatic loop 110 with the pilot valve through a conduit 286. Thus, during forward operation of the hydrostatic transmission 16, the shuttle valve 284 ports fluid from the conduit 111 to the conduit 286 and pilot valve 264. Similarly, during reverse operation of the hydrostatic transmission 16, the shuttle valve 284 ports fluid from the conduit 109 of the hydrostatic loop 110 to the pilot valve 264.

Figure 5:
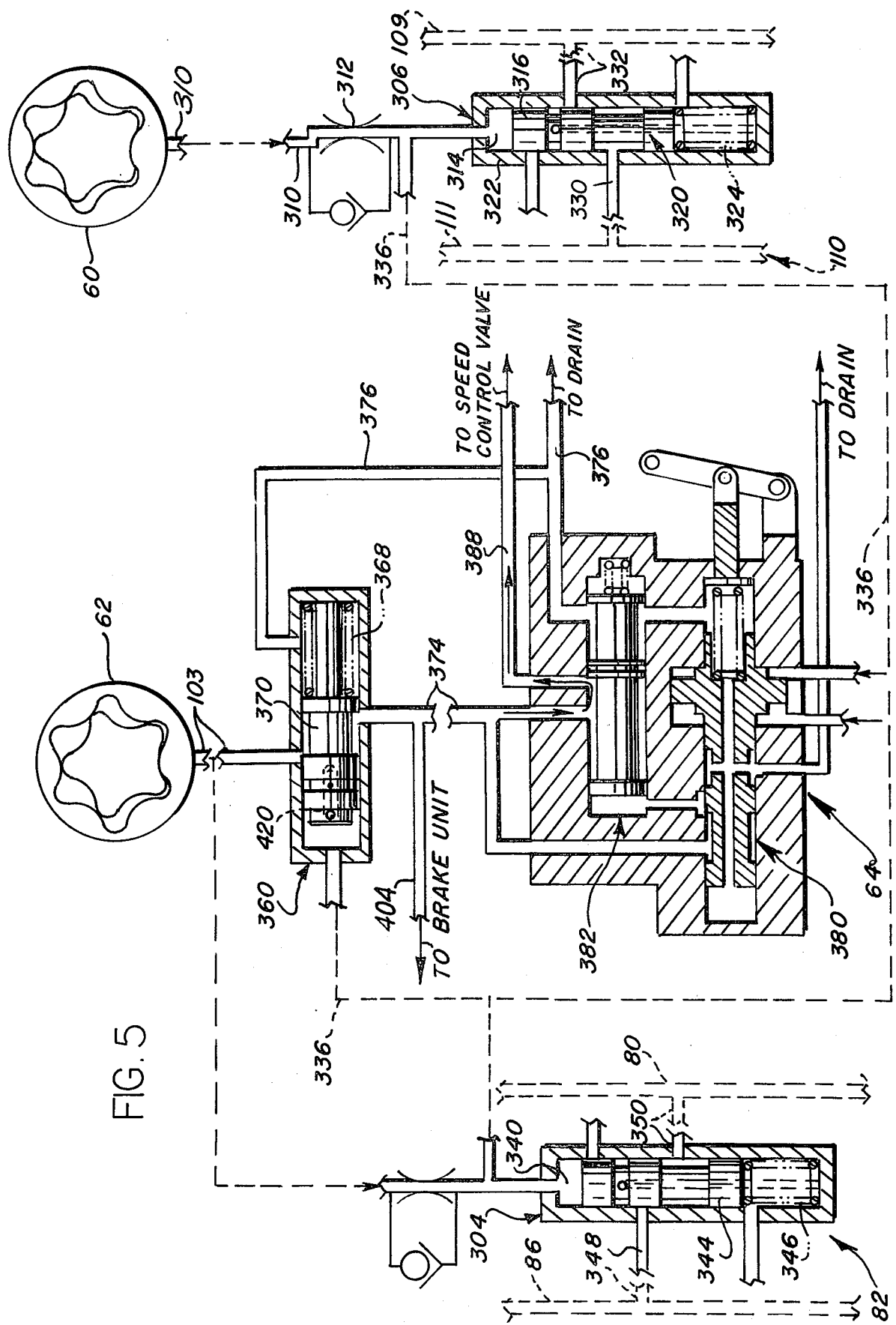
FIG. 5 is an enlarged fragmentary schematic illustration depicting the relationship of a portion of the control apparatus of FIG. 4 to dump valves which are operable to short circuit the hydrostatic loops of the transmissions of FIGS. 2 and 3.

In accordance with one feature of the present invention, when a charge pump 60 or 62 fails, the hydrostatic transmissions 14 and 16 are rendered ineffective to drive the output shafts 36 and 38. In addition, a brake unit 300 (FIG. 6) is activated to engage the vehicle brakes 302. To render the hydrostatic transmissions 14 and 16 ineffective to drive the output shafts 36 and 38, the pump and motor actuated assemblies 50, 52, 56, and 58 are operated to reduce pump stroke and increase motor stroke of units 28, 30, 32, and 34. To compensate for any difference in the rates at which the pump and motor units of the hydrostatic transmissions 14 and 16 are deswashed, the hydrostatic loops 82 and 110 are short circuited by dump valves 304 and 306 (see FIGS. 2, 3, and 5).

Upon a failure of the charge pump 60 and a resulting decrease in the fluid pressure supplied to the conduit 280, the dump valve 306 (FIGS. 3 and 5) is actuated to short circuit the hydrostatic loop 110. Upon a decrease in the fluid pressure in the conduit 280 (FIG. 3) connected to the charge pump 60, the fluid pressure in the low pressure conduit 111 of the hydrostatic loop 110 is decreased. This decrease in fluid pressure in the conduit 111 is transmitted to the shuttle valve 284. A conduit 310 conducts this low pressure fluid from the shuttle valve 284 through an orifice 312 to the dump valve 306 (see FIGS. 3 and 5). The resulting reduction of the fluid pressure in a chamber 314 formed between a head end 316 of a valve member 320 and a valve housing 322 enables the valve member 320 to be moved upwardly (as viewed in FIG. 5) under the influence of a biasing spring 324. This upward movement of the valve member 320 connects the low pressure conduit 111 in fluid communication with the high pressure conduit 109 through conduits 330 and 332 to thereby short circuit the hydrostatic loop 110. Of course short circuiting or dumping of the hydrostatic transmission 16 renders it ineffective to drive the output shaft 38.

Upon a failure of the charge pump 60, the left hydrostatic transmission 14 is also dumped. Thus, the reduction in fluid pressure which is transmitted from the shuttle valve 284 to the dump valve 306 through the conduit 310 and orifice 312 is also transmitted to the dump valve 304 associated with the hydrostatic transmission 14 through a conduit 336 (see FIGS. 2, 3, 4, and 5). The conduit 336 is connected with a pressure chamber 340 in the valve 304 in the same manner as in which the conduit 310 is connected with the pressure chamber 314 in the dump valve 306. The reduction in fluid pressure in the chamber 340 enables a valve member 344 to be moved upwardly (as viewed in FIG. 5) under the influence of a biasing spring 346. This upward movement of the valve member 344 connects the high pressure side 80 of the hydrostatic loop 82 with the low pressure side 86 of the hydrostatic loop. Thus, upon a reduction of the pressure in the chamber 340 and upward movement of the valve member 344 under the influence of the biasing spring 346, the conduits 80 and 86 are connected in fluid communication with each other through conduits 348 and 350 to short circuit or dump the left hydrostatic transmission 14.

The pressure chamber 340 in the dump valve 304 is normally exposed to the pressure in the low pressure conduit in the hydrostatic loop 82. During forward operation of the hydrostatic transmission 14, the shuttle valve 274 connects the low pressure conduit 86 in fluid communication with the dump valve 304 through the fluid conduit 354 and orifice 356. Upon a failure of the charge pump 60, the orifice 356 restricts the fluid flow from the shuttle valve 274 to such an extent that the pressure in the chamber 340 of the dump valve 304 is decreased sufficiently to enable the spring 346 to operate the dump valve and short circuit the hydrostatic loop 82.

In addition to effecting a short circuiting of the hydrostatic loops 82 and 110, a failure of the charge pump 60 results in a destroking or deswashing of the hydrostatic transmissions 14 and 16. This is accomplished by actuating a destroking valve 360 (FIGS. 4 and 5) to connect the speed control valve 42 with drain. This causes the speed control valve 42 to exhaust the pressure responsive motors in the pump and motor actuator assemblies 50, 52, 56, and 58 to simultaneously deswash or destroke the hydrostatic transmissions 14 and 16. destroking the hydrostatic transmission 14 and 16 renders them ineffective to drive the output shafts 36 and 38. It should be noted that this is accomplished without changing the setting of the speed control valve 42.

Upon a failure of the charge pump 60, a resulting reduction in the fluid pressure in the conduit 336 (FIG. 5) is conducted to a chamber 364 in the destroking valve 360. The reduction in fluid pressure in the chamber 364 enables a biasing spring 368 to move a valve member 370 toward the left (as viewed in FIG. 5). This leftward movement of the valve member 370 connects a conduit 374 in fluid communication with a drain conduit 376. Although the drain pressure in the conduit 374 could be transmitted directly to the speed control valve 42, the drain pressure is transmitted to the speed control valve through the anti-stall valve assembly 64.

The anti-stall assembly 64 includes a first stage anti-stall valve assembly 380 which is actuated to effect operation of a second stage anti-stall assembly 382. During normal operation of the anti-stall valve assembly 64, the second stage anti-stall valve assembly 382 is in the open condition illustrated in FIG. 5 connecting the conduit 374 with the speed control valve 42 through a conduit 388 (FIG. 4). Since the destroking valve 360 is normally in the position shown in FIG. 5, high pressure fluid from the charge pump 62 flows to the speed control valve 42 through the destroking valve 360, conduit 374, the second stage anti-stall valve 382, and the conduit 388. In the absence of an impending stalling condition and during normal operating conditions, the speed control valve 42 is continuously supplied with high pressure fluid through the conduit 388. The manner in which the first stage anti-stall valve assembly 380 cooperates with the second stage anti-stall valve assembly 382 and speed control valve 42 to prevent stalling of the engine 20 is not, per se, a feature of the present invention and is the same as is described in U.S. patent application Ser. No. 356,720 filed May 3, 1973, by Harold R. Ward and entitled "Hydrostatic Transmission Anti-Stall System" now abandoned. The operation of the anti-stall assembly 64 is also somewhat similar to the operation of the anti-stall assembly disclosed in U.S. patent application Ser. No. 237,086 filed Mar. 22, 1972, by Edward J. Bojas and entitled "Hydrostatic Transmission Control System" now U.S. Pat. No. 3,783,611.

Upon a failure of one of the charge pumps, for example, the charge pump 60, the destroking valve 360 is actuated to connect the conduit 374 with the conduit 376 which is connected directly to drain or reservoir. The conduit 388 and speed control valve 42 are then exhausted to drain through the second stage anti-stall valve 382. Exhausting the speed control valve 42 to drain results in a simultaneous destroking or deswashing of both hydrostatic transmissions 14 and 16.

The speed control valve 42 is connected in continuous communication with the pressure responsive pump and motor actuator assemblies 50, 52, 56, and 58. During normal operation of the hydrostatic transmissions 14 and 16, the speed control valve 42 continuously modulates the fluid pressure conducted to the pump and motor actuator assemblies 50, 52, 56, and 58 in the manner described in the aforementioned U.S. patent application Ser. No. 248,685 filed Apr. 28, 1972 now U.S. Pat. No. 3,795,109. Upon an exhausting of the conduit 388 and speed control valve 42 to drain, the speed control valve connects the pump and motor actuator assemblies 50, 52, 56, and 58 with drain. This enables the biasing springs in the pump and motor actuator assemblies to deswash or destroke the hydrostatic transmissions 14 and 16. Thus, during forward operation of the hydrostatic transmissions 14 and 16, operation of destroking valve 360 connects the speed control valve 42, the conduit 114, the left steering control valve 46 and the conduit 120 to drain (FIGS. 2 and 4). This results in a reduction in the fluid pressure conducted to the pressure responsive secondary motor 126 in the pump actuator assembly 50. This reduction in pressure is also transmitted through the selector valve 323 to the secondary motor 212 in the motor actuator assembly 56. This is accomplished without changing the setting of the control handle 138.

Assuming that the swashplate 90 of the motor unit 32 has been moved from the maximum displacement condition shown in FIG. 2 toward a minimum displacement condition, the biasing spring 230 in the secondary motor 212 operates the secondary motor ot actuate the pilot valve 216 through the floating link feedback arrangement 222. This results in a porting of fluid to the swashplate motor 218 to move the swashplate 90 to the stroked or maximum displacement condition shown in FIG. 2.

After the stroking of the motor unit 32, the secondary motor 126 actuates the pilot valve 128 through the feedback linkage 134 to effect a deswashing or destroking of the pump unit 28. Thus, when the conduit 120 is exhausted to drain, the resulting low pressure in the secondary motor 126 of the pump actuator assembly 50 enables a bias spring to return the secondary motor to a neutral or unactuated condition. This operation of the motor 126 actuates the floating link feedback linkage 134 to operate the pilot valve 128 and port fluid to the swashplate motor 132. The swashplate motor 132 then moves the swashplate 70 of the pump unit 28 from the swashed or stroked condition of FIG. 2 to a destroked or minimum displacement condition in which the pump unit 28 is ineffective to supply fluid to the motor unit 32. When the swashplate 70 is in the neutral minimum displacement condition, the pilot valve 128 connects the swashplate motor 132 with drain so that the springs 135 are effective to hold the swashplate in the minimum displacement condition.

Similarly, when the destroking valve 360 is actuated upon a failure of the charge pump 60 during forward operation of the hydrostatic transmission 16, the resulting reduction in fluid pressure conducted to the speed control valve 42 and the conduit 114 results in a reduction in the fluid pressure transmitted from the right steering control valve 48 to the pump and motor actuator assemblies 52 and 58 for the right hydrostatic transmission 16. The pressure responsive secondary control motors 250 and 262 in the pump and motor actuator assemblies 52 and 58 cause the pump and motor units 30 and 34 to be stroked in the manner previously explained in connection wih the left hydrostatic transmission 14.

During reverse operation of the hydrostatic transmissions 14 and 16, actuation of the destroking valve 360 connects the steering control valve 42 and conduit 116 with drain. Since the conduit 116 conducts relatively high pressure control fluid to the steering control valves 46 and 48 during reverse operation, the pressure responsive control motors in the actuator assemblies effect a destroking of the hydrostatic transmissions 14 and 16. Thus, upon a failure of the charge pressure during either forward or reverse operation of the hydrostatic transmissions 14 and 16, the hydrostatic transmissions are dumped by the dump valves 304 and 306 and destroked in response to operation of the valve 360 without moving the control handle 138.

Figure 6:
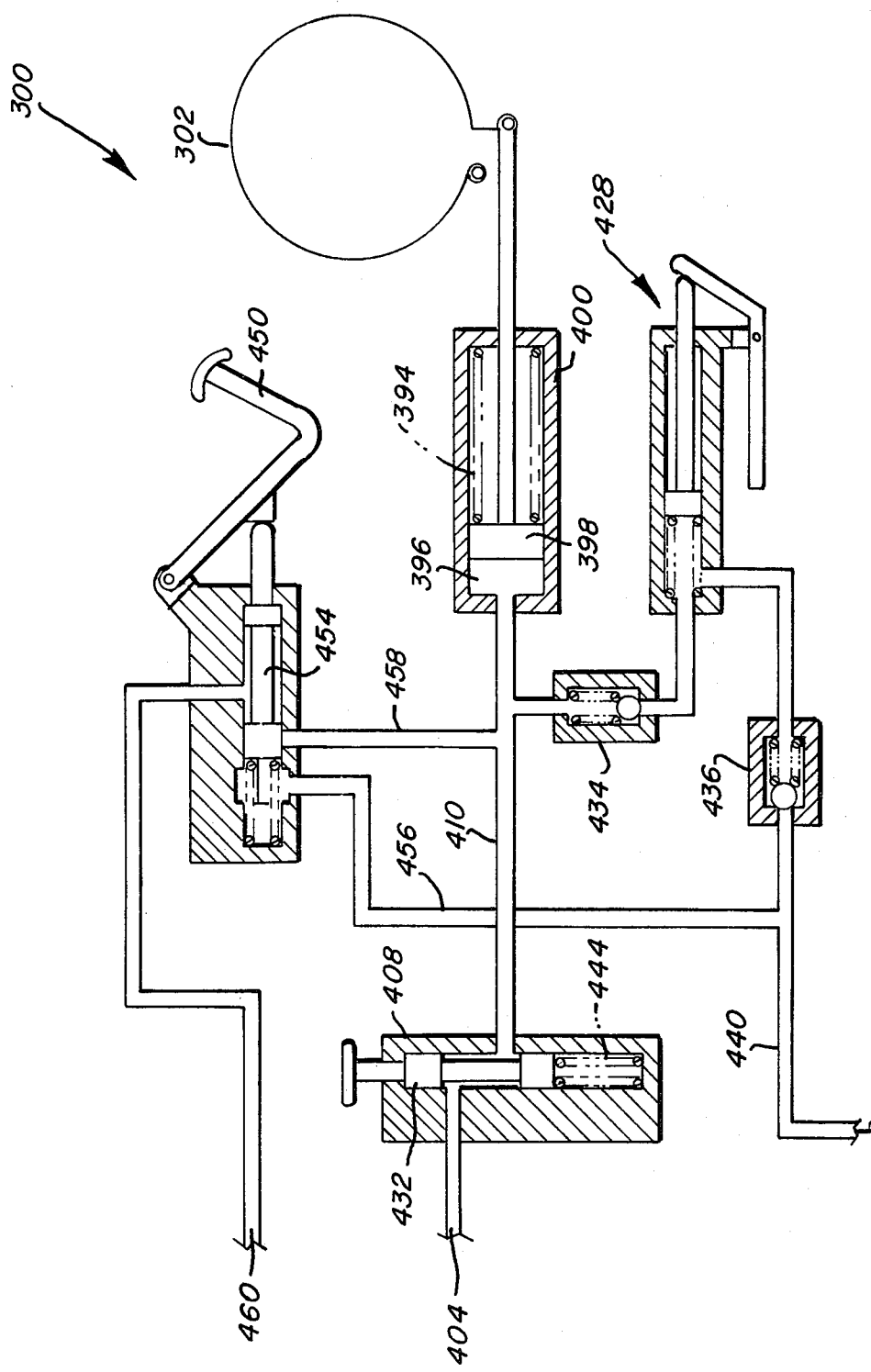
FIG. 6 is an enlarged schematic illustration of a brake unit utilized in the vehicle of FIG. 1.

In addition to effecting a destroking or deswashing of the hydrostatic transmissions 14 and 16 and operation of the dump valves 304 and 306 to short circuit the hydrostatic loops of the transmissions, failure of the charge pump 60 results in the setting or actuation of the brake 302 (see FIG. 6). The brake 302 is normally held in a disengaged condition against the influence of a biasing spring 394 by fluid pressure in a chamber 396 formed between a piston 398 and cylinder 400. However, upon operation of the destroking valve 360 and exhausting of the conduit 374 to the drain conduit 376, a conduit 404 (see FIG. 4) is also exhausted to drain. This results in the exhausting of the pressure chamber 396 (FIG. 6) to drain through a normally open valve 408. The valve 408 is connected with the pressure chamber 396 through the conduit 410 and with the conduit 404. Upon operation of the destroking valve 360 to effect an exhausting of the conduits 374 and 404 to drain, the pressure in the chamber 396 is reduced so that spring 394 is effective to move the piston 398 toward the left (as viewed in FIG. 6) to engage the brake 302.

If the charge pump 62 should fail, the dump valves 304 and 306 are operated to short circuit the hydrostatic loops of the transmissions 14 and 16. Also, the destroking valve 360 is actuated to effect a deswashing or destroking of the hydrostatic transmissions and the vehicle brakes are set in much the same manner as previously explained in connection with a failure of the charge pump 60. Thus, a failure of the charge pump 62 results in a reduction in the fluid pressure in the conduit 102 which is connected with the hydrostatic loop 82 for the hydrostatic transmission 14 through one of the check valves 98 or 100 (FIG. 2). During forward operation of the vehicle 110, the conduit 102 is connected to the low pressure side or conduit 86 of the hydrostatic loop 82 through the check valve 98. Upon a failure of the charge pump 62 and a reduction of the fluid pressure in the conduit 102, the reduction in the fluid pressure in the conduit 86 is conducted through the shuttle valve 274 to the pressure chamber 340 in the dump valve 304 (see FIG. 5) through the conduit 354 and orifice 356. The resulting reduction in fluid pressure in the chamber 340 enables the biasing spring 346 to operate the dump valve 304 and connect the conduit 348 in fluid communication with the conduit 350 to thereby short circuit the hydrostatic loop 82.

The reduction in fluid pressure in the conduit 354 is transmitted by the conduit 336 (FIG. 5) to the pressure chamber 314 in the dump valve 306. This results in operation of the dump valve 306 to connect the conduit 109 in fluid communication with the conduit 111 to thereby short circuit the hydrostatic loop 110. The orifice 312 restricts fluid flow from the properly functioning charge pump 60 so that the dump valve 306 is operated under the influence of the pressure in the conduit 336. The relatively low flow from a properly functioning charge pump 60 or 62 through the associated one of the orifices or restrictions 312 or 356 and into the opposite hydrostatic loop via relatively low restriction check valves maintains fluid pressure in conduit 336 at the lower charge pump pressure.

Failure of the charge pump 62 also results in operation of the destroking valve 360 to effect a deswashing of the hydrostatic transmissions 14 and 16. Upon a reduction in the pressure in the conduit 336 the fluid pressure in the chamber 364 is reduced so that the biasing spring 368 moves the valve member 370 toward the left (as viewed in FIG. 5). This connects the drain conduit 376 in fluid communication with the second stage 382 of the anti-stall valve assembly 64 through the conduit 374. As was previously explained in connection with a failure of the charge pump 60, when the conduit 388 is exhausted to drain, the speed control valve 42 exhausts the pressure responsive secondary control motors in the pump and motor actuator assemblies 50, 52, 56, and 58 to drain to thereby effect a destroking of the hydrostatic transmissions 14 and 16.

A failure of the charge pressure also results in setting of the vehicle brakes 302. Upon operation of the destroking valve 360, the fluid pressure in the conduits 374 and 404 is reduced to thereby exhaust the pressure chamber 396. This results in movement of the piston 398 (see FIG. 6) to engage the vehicle brakes 302. Since the hydrostatic loops 82 and 110 have been short circuited and the hydrostatic transmissions 14 and 16 destroked contemporaneously with actuation of the brakes 302, the brakes are not subjected to unnecessary wear.

If it is desired to release the brakes 302 so that the vehicle 10 can be moved after one of the charge pumps 60 or 62 has failed, it is necessary to actuate the valve 408 to a closed condition and operate a manual brake release pump 428 (FIG. 6). Thus, upon operation of the valve 408 to a closed condition, an annular land 432 blocks fluid flow between the conduit 404 and 410. Operation of the brake pump 428 results in a pumping of fluid through a check valve 434 to the chamber 396. It should be noted that a second check valve 436 prevents fluid flow from the pump 428 to drain through a conduit 440. As the fluid pressure in the chamber 396 increases due to the action of the pump 428, the piston 398 is moved toward the right (as viewed in FIG. 6) against the influence of the spring 394 to thereby release the vehicle brakes.

When the brake control valve 408 is released, a spring 444 moves the valve upwardly (as viewed in FIG. 6) to again connect the fluid conduit 410 in fluid communication with the conduit 404 and drain. The resulting exhausting of the pressure chamber 396 enables the biasing spring 394 to move the piston 398 to re-engage the brakes 302.

It is contemplated that an operator will actuate the vehicle brakes during normal operation of the vehicle and charge pump 60 and 62. To prevent unnecessary wear on the vehicle brakes 302, when the operator depresses a brake pedal 450 (FIG. 5) the hydrostatic transmissions 14 and 16 are destroked or deswashed and the dump valves 304 and 306 are operated to short circuit the hydrostatic loops 82 and 110. Short circuiting the hydrostatic loops 82 and 110 contemporaneously with destroking of the hydrostatic transmissions 14 and 16 compensates for any difference in speed with which the hydrostatic transmissions are operated to the deswashed or destroked condition. It is contemplated that this feature will be particularly valuable if the vehicle brakes are applied during a turning of the vehicle.

Upon actuation of the brake pedal 450, a valve spool 454 is moved toward the left (as viewed in FIG. 6). This connects a drain or reservoir conduit 456 with a conduit 458 connected to the pressure chamber 396 by the conduit 410. The resulting exhausting of the pressure chamber 396 enables the piston 398 to be moved under the influence of the biasing spring 394 to engage the brakes 302.

In addition to the exhausting of the conduit 458 to drain, actuation of the valve 454 connects a conduit 460 with drain conduit 456. The conduit 460 is connected in fluid communication with the conduit 336 which interconnects the two dump valves 304 and 306. Therefore, upon actuation of the brake pedal and operation of the valve 454, the fluid pressure in the conduit 336 is reduced. As was previously explained, this results in a reduction in the fluid pressure in the chambers 340 and 314 of the dump valves 304 and 306. The dump valves 304 and 306 are then operated under the influence of the biasing springs 346 and 324 to short circuit the hydrostatic loops 82 and 110 of the hydrostatic transmissions 14 and 16.

In addition to effecting actuation of the dump valves 304 and 306, reducing the fluid pressure in the conduit 336 upon actuation of the brake pedal 450 results in operation of the destroking valve 360. Thus, the reduced fluid pressure in the conduit 336 is transmitted to the chamber 364 in the destroking valve 360. This enables the biasing spring 368 to move the destroking valve spool 370 toward the left (as viewed in FIG. 5) to connect the conduit 374 with the drain conduit 376. As was previously explained, connection of the conduit 374 with the drain conduit 376 exhausts the speed control valve 42 to drain through the second stage anti-stall vavle assembly 382 and the conduit 388. Exhausting the speed control valve 42 to drain results in an exhausting of the pressue responsive secondary motors and the actuator assemblies 50, 52, 56, and 58 to drain to effect a deswashing or destroking of the hydrostatic transmissions 14 and 16.

In view of the foregoing description, it can be seen that the hydrostatic loops 82 and 110 of the hydrostatic transmissions 14 and 16 are supplied with makeup or charging fluid from the charge pumps 60 and 62. Upon a failure or decrease in the output pressure of one of the charge pumps 60 or 62, pressure responsive valves are actuated to render the hydrostatic transmissions 14 and 16 ineffective to drive the output members 36 and 38. In one specific preferred embodiment of the invention, the charge pumps 60 and 62 normally supply fluid at a pressure between 210 and 280 p.s.i. above drain or reservoir pressure. Upon a failure of one of the charge pumps with a resulting decrease in its output pressure to approximately 100 p.s.i., the destroking valve 360 is actuated under the influence of the biasing spring 268 to exhaust the speed control valve 42 to drain. Operation of the destroking valve 360 exhausts the pressure chamber 396 to effect operation of the brakes 302 contemporaneously with destroking or dewashing or the hydrostatic transmissions. The dump valves 304 and 306 are actuated when the fluid pressure in the conduit 336 is between 90 and 95 p.s.i. It should be understood that the foregoing specific pressure valves for actuation of the destroking valve 360 and dump valves 304 and 306 are provided for purposes of illustration only and it is not intended to limit the invention disclosed herein to any specific operating pressures for the valves.

In addition to effecting a deswashing and dumping of the hydrostatic transmissions 14 and 16 in response to a failure of one of the charge pumps 60 and 62, the hydrostatic transmissions are deswashed and dumped upon actuation of the brake pedal 450. Thus, when the brake pedal 450 is depressed the conduit 460 is connected with drain to reduce the fluid pressure conducted to the destroking valve 360 and dump valves 304 and 306. This results in a destroking and dumping of hydrostatic transmissions 14 and 16 as the brakes are set.

Although the two charge pumps 60 and 62 have been illustrated in FIG. 4 as being spaced axially apart, it is contemplated that the charge pumps 60 and 62 could be disposed in axial alignment and driven by a common output shaft from the engine 20. The dump valves 304 and 306 and destroking valve 360 could be actuated under the influence of fluid pressure rather than the valve springs 324, 346 and 368 if desired. It is also contemplated that more than the single brake 302 could be actuated upon failure of a charge pressure in lines 102 and/or 280.

Having described a specific preferred embodiment of the invention, the following is claimed:

1. An apparatus comprising a hydrostatic transmission, said hydrostatic transmission including a pump unit, a motor unit adapted to be connected with an output member, and first conduit means having one passage for conducting relatively high pressure fluid from said pump unit to said motor unit and another passage for conducting relatively low pressure fluid from said motor unit to said pump unit, charge pump means for supplying fluid to said hydrostatic transmission, actuator means for varying the effective displacement of at least one of said units of said hydrostatic transmission to vary the speed at which the output member is driven by said motor unit, said actuator means including pressure responsive motor means for effecting a variation in the displacement of said one unit in response to a variation in control fluid pressure, second conduit means for conducting control fluid pressure to said motor means, pressure controller means for varying the control fluid pressure conducted to said motor means to vary the speed at which the output member is driven by said first motor unit, said pressure controller means being operable from a neutral setting in which said motor unit is substantially ineffective to drive the output member to any one of a plurality of operating settings in each of which said pressure controller means is effective to port a different fluid pressure to said motor means, and control means for varying the control fluid pressure ported to said motor means in response to a decrease in the fluid pressure output of said charge pump means while maintaining the setting of said pressure controller means substantially constant to effect a reduction in the speed at which said output member is driven, said control means including pressure responsive valve means for decreasing the relatively high fluid pressure in said one passage in response to a decrease in the charge pressure during operation of said hydrostatic transmission, said valve means including a valve operable from a closed condition to an open condition enabling relatively high pressure fluid to flow from said one passage and means for effecting operation of said valve from the closed condition to the open condition in response to a decrease in the charge pressure.

2. An apparatus comprising a hydrostatic transmission, said hydrostatic transmission including a pump unit, a motor unit adapted to be connected with an output member, and first conduit means for conducting fluid from said pump unit to said motor unit, charge pump means for supplying fluid to said hydrostatic transmission, actuator means for varying the effective displacement of at least one of said units of said hydrostatic transmission to vary the speed at which the output member is driven by said motor unit, said actuator means including pressure responsive motor means for effecting a variation in the displacement of said one unit in response to a variation in control fluid pressure, second conduit means for conducting control fluid pressure to said motor means, pressure controller means for varying the control fluid pressure conducted to said motor means to vary the speed at which the output member is driven by said first motor unit, said pressure controller means being operable from a neutral setting in which said motor unit is substantially ineffective to drive the output member to any one of a plurality of operating settings in each of which said pressure controller means is effective to port a different fluid pressure to said motor means, control means for varying the control fluid pressure ported to said motor means in response to a decrease in the fluid pressure output of said charge pump means while maintaining the setting of said pressure controller means substantially constant to effect a reduction in the speed at which said output member is driven, and brake means operable between a release condition and an activated condition in which said brake means retards movement of a vehicle associated with said hydrostatic transmission, said control means including means for effecting operation of said brake means from the release condition to the activated condition in response to a decrease in the fluid pressure output of said charge pump means.

3. An apparatus for use in transmitting drive forces from an engine to first and second output members, said apparatus comprising a first hydrostatic transmission for transmitting drive forces from the engine to the first output member, said first hydrostatic transmission including a first pump unit adapted to be driven by the engine, a first motor unit adapted to be drivingly connected with the first output member, first conduit means for conducting fluid under pressure from said first pump unit to said first motor unit to effect operation of said first motor unit to drive the first output member, and second conduit means for conducting fluid to said first pump unit, a second hydrostatic transmission for transmitting drive forces from the engine to the second output member, said second hydrostatic transmission including a second pump unit adapted to be driven by the engine, a second motor unit adapted to be drivingly connected with the second output member, third conduit means for conducting fluid under pressure from said second pump unit to said second motor unit to effect operation of said second motor unit to drive said second output member, and fourth conduit means for conducting fluid to said second pump unit, a first charge pump adapted to be driven by the engine, fifth conduit means for connecting said first charge pump in fluid communication with said second conduit means to enable said first charge pump to supply fluid to said second conduit means during operation of said first hydrostatic transmission, a second charge pump adapted to be driven by the engine, sixth conduit means for connecting said second charge pump in fluid communication with said fourth conduit means to enable said second charge pump to supply fluid to said fourth conduit means during operation of said second hydrostatic transmission, and control means for effecting a decrease in the speeds at which both the first and second output members are driven by said first and second hydrostatic transmissions in response to a decrease in the fluid pressure output of either one of said charge pumps.

4. An apparatus as set forth in claim 3 wherein said control means includes first pressure responsive dump valve means for decreasing the fluid pressure in said first fluid conduit means in response to a decrease in the fluid pressure output of said first charge pump during operation of said first hydrostatic transmission, said first valve means including a first valve operable between a closed condition and an open condition enabling fluid to flow from said first conduit means and means for effecting operation of said first valve from the closed condition to the open condition in response to a decrease in the fluid pressure output of said first charge pump, and second pressure responsive dump valve means for decreasing the fluid pressure in said third fluid conduit means in response to a decrease in the fluid pressure output of said first charge pump during operation of said second hydrostatic transmission, said second valve means including a second valve operable between a closed condition and an open condition enabling fluid to flow from said third conduit means and means for effecting operation of said second valve from the closed condition to the open condition in response to a decrease in the fluid pressure output from said first charge pump.

5. An apparatus as set forth in claim 3 further including first actuator means for varying the displacement of at least one of said first pump and motor units to vary the speed at which the first output member is driven by said first motor unit during operation of said first hydrostatic transmission, and second actuator means for varying the displacement of at least one of said second pump and motor units to vary the speed at which the second output member is driven by said second motor unit during operation of said second hydrostatic transmission, said control means including pressure responsive means for effecting opertion of said first and second actuator means to reduce the speeds at which the first and second output members are driven in response to a decrease in the fluid pressure output of said first charge pump.

6. An apparatus as set forth in claim 5 wherein said pressure responsive means includes means for effecting operation of said first and second actuator means to reduce the speeds at which the first and second output members are driven in response to a decrease in the fluid pressure output of said second charge pump.

7. An apparatus as set forth in claim 3 further including brake means operable between a release condition and an activated condition in which said brake means retards movement of a vehicle associated with said first and second hydrostatic transmissions, and means for effecting operation of said brake means from the release condition to the activated condition in response to a decrease in the fluid pressure output of either one of said charge pumps.

8. An apparatus as set forth in claim 3 wherein said control means including a pressure responsive valve means operable from a first condition to a second condition to effect a reduction in the speeds at which the first and second output members are driven by said first and second hydrostatic transmissions, seventh fluid conduit means connected in fluid communication with said responsive valve means for conducting from fluid pressure from said first charge pump to said pressure responsive valve means, eighth fluid conduit means connected in fluid communication with said pressure responsive valve means and said seventh fluid conduit means for conducting fluid pressure from said second charge pump to said pressure responsive valve means, first restriction means for restricting fluid flow through said seventh fluid conduit means to said pressure responsive valve means to enable said pressure responsive valve means to respond to a decrease in the fluid pressure in said eighth fluid conduit means upon a decrease in the fluid pressure output of said second charge pump, second restriction means for restricting fluid flow through said eighth fluid conduit means to said pressure responsive valve means to enable said pressure responsive valve means to respond to a decrease in the fluid pressure in said seventh fluid conduit means upon a decrease in the fluid pressure output of said first charge pump.

9. An apparatus for use in transmitting drive forces from an engine to first and second output members, said apparatus comprising a first hydrostatic transmission for transmitting drive forces from the engine to the first output member, said first hydrostatic transmission including a first pump unit adapted to be driven by the engine, a first motor unit adapted to be drivingly connected with the first output member, first conduit means for conducting fluid under pressure from said first pump unit to said first motor unit to effect operation of said first motor unit to drive the first output member, and second conduit means for conducting fluid to said first pump unit, a second hydrostatic transmission for transmitting drive forces from the engine to the second output member, said second hydrostatic transmission including a second pump unit adapted to be driven by the engine, a second motor unit adapted to be drivingly connected with the second output member, third conduit means for conducting fluid under pressure from said second pump unit to said second motor unit to effect operation of said second motor unit to drive said second output member, and fourth conduit means for conducting fluid to said second pump unit, first actuator means for varying the displacement of at least one of said first pump and motor units to vary the speed at which the first output member is driven by said first motor unit during operation of said first hydrostatic transmission, second actuator means for varying the displacement of at least one of said second pump and motor units to vary the speed at which the second output member is driven by said second motor unit during operation of said second hydrostatic transmission, brake means operable between a disengaged condition and an engaged condition in which said brake means is effective to retard movement of a vehicle with which said first and second hydrostatic transmissions are associated, and control means for effecting operation of said brake means from the disengaged condition to the engaged condition and for contemporaneously therewith effecting operation of said first and second actuator means to reduce the speed at which the first and second output members are driven by said first and second motor units.

10. An apparatus as set forth in claim 9 further including fifth conduit means for conducting control fluid pressure to said first and second actuator means, and pressure controller means for varying the control fluid pressure conducted to said first and second actuator means as a function of the extent of operation of said pressure controller means from an initial condition, said first and second actuator means each including pressure responsive motor means for effecting a variation in the effective displacement of at least one of said pump and motor units of the associated one of said hydrostatic transmissions upon a variation in the control fluid pressure conducted to said first and second actuator means, said control means including means for effecting a variation in the control pressure conducted from said pressure controller means to said first and second actuator means upon operation of said brake means from the disengaged condition to the engaged condition.

11. An apparatus as set forth in claim 10 further including first valve means operable between a closed condition and an open condition enabling fluid to flow from said first conduit means to said second conduit means, second valve means operable between an open condition and a closed condition enabling fluid to flow from said third conduit means to said fourth conduit means, said control means including means for effecting operation of said first and second valve means from their closed conditions to their open conditions contemporaneously with operation of said brake means from the disengaged condition to the engaged condition.

12. An apparatus as set forth in claim 10 further including a first charge pump adapted to be driven by the engine, sixth conduit means for connecting said first charge pump in fluid communication with said second conduit means to enable said first charge pump to supply fluid to said second conduit means during operation of said first hydrostatic transmission, a second charge pump adapted to be driven by the engine, seventh conduit means for connecting said second charge pump in fluid communication with said fourth conduit means to enable said second charge pump to supply fluid to said fourth conduit means during operation of said second hydrostatic transmission, and means for connecting at least one of said charge pumps in fluid communication with said pressure controller means to supply fluid to said pressure controller means.

13. An apparatus as set forth in claim 12 wherein said control means includes means for effecting operation of said brake means from the disengaged condition to the engaged condition in response to a decrease in the fluid pressure output of either one of said charge pumps.

14. An apparatus as set forth in claim 9 further including fifth conduit means for conducting control fluid pressure to said first and second actuator means, and pressure controller means for varying the control fluid pressure conducted to said first and second actuator means to vary the speed at which the first and second output members are driven by said first and second motor units, said pressure controller means being operable from a neutral setting in which said first and second motor units are substantially ineffective to drive the first and second output members to any one of a plurality of operating settings in each of which said pressure controller means is effective to port a different fluid pressure to said first and second actuator means, said first and second actuator means each including pressure responsive means for varying the speed at which the associated output member is driven by the associated one of said motor units as a function of variations in the control fluid pressure conducted to said first and second actuator means, said control means including means for varying the control fluid pressure ported to said first and second actuator means while maintaining the setting of said pressure controller means substantially constant to effect a reduction in the speed at which the first and second output members are driven upon actuation of said brake means to the engaged condition without changing the setting of said pressure controller means.

15. An apparatus comprising a hydrostatic transmission having a pump unit adapted to be driven by an input member, a motor unit adapted to be connected with an output member, said motor unit including a swashplate movable between a first position in which said motor unit has a relatively large displacement and a second position in which said motor unit has a relatively small displacement, and hydrostatic loop means for conducting fluid between said pump and motor units during operation of said hydrostatic transmission, said hydrostatic loop means including first conduit means for conducting relatively high pressure fluid from said pump unit to said motor unit during operation of said hydrostatic transmission and second conduit means for conducting relatively low pressure fluid from said motor unit to said pump unit during operation of said hydrostatic transmission, swashplate motor means for moving said swashplate between said first and second positions, motor control valve means operable from a first condition to a second condition to effect operation of said swashplate motor means to move said swashplate between the first and second positions to thereby vary the displacement of said motor unit, third conduit means for conducting relatively low pressure fluid from said second conduit means to said motor control valve means, said motor control valve means being operable to port relatively low pressure fluid from said second conduit means to said swashplate motor means upon operation of said motor control valve means from the first condition to the second condition to thereby effect operation of said swashplate motor means under the influence of the relatively low pressure fluid, and control means for effecting operation of said motor control valve means between the first and second positions.

16. An apparatus as set forth in claim 15 wherein said control means includes actuator motor means for operating said motor control valve means between the first and second conditions, charge pump means for supplying control fluid, and main control valve means for porting fluid from said charge pump means to said actuator motor means to thereby effect operation of said motor control valve means.

17. An apparatus comprising a reversible hydrostatic transmission capable of driving an output member in either one of two directions, said hydrostatic transmission comprising a pump unit adapted to be driven by an output member, said pump unit including a swashplate movable between a forward actuated position and a reverse actuated positions, a motor unit adapted to be connected with the output member, said motor unit including a swashplate movable between a first position in which said motor unit has a relatively large displacement and a second position in which said motor unit has a relatively small displacement, and hydrostatic loop means for conducting fluid between said pump and motor units during operation of said hydrostatic transmission to drive the output member in either one of the two directions, said hydrostatic loop means including first conduit means for conducting relatively high pressure fluid from said pump unit to said motor unit during operation of said hydrostatic transmission to drive the output member in a first one of the two directions and for conducting relatively low pressure fluid from said motor unit to said pump unit during operation of said hydrostatic transmission to drive the output member in a second one of the two directions and second conduit means for conducting relatively low pressure fluid from said motor unit to said pump unit during operation of said hydrostatic transmission to drive the output member in the first direction and for conducting relatively high pressure fluid from said pump unit to said motor unit during operation of said hydrostatic transmission to drive the output member in the second direction, swashplate motor means for moving said motor unit swashplate between said first and second positions, motor control valve means operable from a first condition to a second condition to effect operation of said swashplate motor means to move said motor unit swashplate between the first and second positions to thereby vary the displacement of said motor unit, third conduit means for conducting relatively low pressure fluid from said second conduit means to said motor control valve means during operation of said hydrostatic transmission to drive the output member in the first direction and for conducting relatively low pressure fluid from said first conduit means to said motor control valve means during operation of said hydrostatic transmission to drive the output member in the second direction, and control means for effecting operation of said motor control valve means between the first and second positions.

18. An apparatus as set forth in claim 17 further including second valve means connected in fluid communication with said first and second fluid conduits means for porting relatively low pressure fluid from said second conduit means to said third conduit means during operation of said hydrostatic transmission to drive the output member in the first direction and for porting relatively low pressure fluid from said first conduit means to said third conduit means during operation of said hydrostatic transmission to drive the output member in the second direction.

19. An apparatus as set forth in claim 18 wherein said third conduit means includes a single fluid passage extending between said second valve means and said motor control valve means.

20. An apparatus for use in transmitting drive forces from an engine to first and second output members, said apparatus comprising a first hydrostatic transmission for transmitting drive forces from the engine to the first output member, said first hydrostatic transmission including a first pump unit adapted to be driven by the engine, a first motor unit adapted to be drivingly connected with the first output member, first conduit means for conducting fluid under pressure from said first pump unit to said first motor unit to effect operation of said first motor unit to drive the first output member, and second conduit means for conducting fluid to said first pump unit, a second hydrostatic transmission for transmitting drive forces from the engine to the second output member, said second hydrostatic transmission including a second pump unit adapted to be driven by the engine, a second motor unit adapted to be drivingly connected with the second output member, third conduit means for conducting fluid under pressure from said second pump unit to said second motor unit to effect operation of said second motor unit to drive said second output member, and fourth conduit means for conducting fluid to said second pump unit, first actuator means for varying the displacement of at least one of said first pump and motor units to vary the speed at which the first output member is driven by said first motor unit during operation of said first hydrostatic transmission, second actuator means for varying the displacement of at least one of said second pump and motor units to vary the speed at which the second output member is driven by said second motor unit during operation of said second hydrostatic transmission, brake means operable between a disengaged condition and an engaged condition in which said brake means is effective to retard movement of a vehicle with which said first and second hydrostatic transmissions are associated, the control means for effecting operation of said brake means from the disengaged condition to the engaged condition and for contemporaneously therewith effecting operation of said first and second actuator means to reduce the speed at which the first and second output members are driven by said first and second motor units, said first and second pump units each include a movable swashplate, said first and second actuator means each including pump actuator means for varying the displacement of the associated one of said pump units by moving the associated one of said swashplates, each of said pump actuator means including primary motor means for moving the associated one of said swashplates from an initial position, a pilot valve operable between a null position and any one of a plurality of positions enabling fluid to flow from a source of fluid to said primary motor means to effect operation of said primary motor means and movement of the associated one of said swashplates, reversible secondary motor means for operating said pilot valve between the null and actuated positions, said secondary motor means being operable from an initial position in response to variations in control fluid pressure conducted to said secondary motor means, feedback means for operating said pilot valve from any one of the plurality of actuated positions to the null position in response to movement of the associated one of said swashplates by said primary motor means to an extent which is a function of the extent of operation of said secondary motor means, and pressure controller means for varying the control fluid pressure conducted to said first and second actuator means as a function of the extent of operation of said pressure controller means from an initial condition, said pressure controller means being operable to vary the control fluid pressure conducted to said secondary motor means in each of said pump actuator means as a function of the extent of operation of said pressure controller means from the initial condition to control the extent to which the swashplates of said first and second pump units are moved.

21. An apparatus for use in transmitting drive forces from an engine to first and second output members, said apparatus comprising a first hydrostatic transmission having a pump unit adapted to be driven by the engine and a motor unit for transmitting drive forces to the first output member, a second hydrostatic transmission having a pump unit adapted to be driven by the engine and a motor unit for transmitting drive forces to the second output member, a first charge pump adapted to be driven by the engine, first conduit means for connecting said first charge pump in fluid communication with said first hydrostatic transmission, a second charge pump adapted to be driven by the engine, second conduit means for connecting said second charge pump in fluid communication with said second hydrostatic transmission, and control means for effecting a decrease in the speeds at which both the first and second output members are driven by said first and second hydrostatic transmissions in response to a decrease in the fluid pressure in either said first or said second conduits.

22. An apparatus as set forth in claim 21 further including brake means operable between a release condition and an activated condition in which said brake means retards movement of a vehicle associated with said first and second hydrostatic transmissions, and means for effecting operation of said brake means from the release condition to the activated condition in response to a decrease in the fluid pressure in either one of said first or second conduits.

23. An apparatus as set forth in claim 22 further including valve means for dumping said first and second hydrostatic transmissions contemporaneously with operation of said brake means from the release condition to the activated condition.

24. An apparatus for use in transmitting drive forces from an engine to first and second output members used to propel a vehicle, said apparatus comprising a first hydrostatic transmission for transmitting drive forces from the engine to the first output member, a second hydrostatic transmission for transmitting drive forces from the engine to the second output member, a first charge pump adapted to be driven by the engine, first conduit means for connecting said first charge pump in fluid communication with said first hydrostatic transmission, a second charge pump adapted to be driven by the engine, second conduit means for connecting said second charge pump in fluid communication with said second hydrostatic transmission, brake means operable between a release condition and an activated condition in which said brake means is capable of retarding movement of the vehicle independent of said first and second hydrostatic transmissions, and means for effecting operation of said brake means from the release condition to the activated condition in response to a decrease in the fluid pressure in either one of said first or second conduits.

25. An apparatus as set forth in claim 24 further including first actuator means for varying the speed at which the first output member is driven by said first hydrostatic transmissions, second actuator means for varying the speed at which the second output member is driven by said second hydrostatic transmission, and means for effecting operation of said first and second actuator means to reduce the speeds at which the first and second output members are driven in response to a decrease in the fluid pressure output of either one of said charge pumps.

26. An apparatus as set forth in claim 24 further including valve means for dumping said first and second hydrostatic transmissions contemporaneously with operation of said brake means from the release condition to the activated condition.

27. An apparatus for use in transmitting drive forces from an engine to first and second output members, said apparatus comprising a first hydrostatic transmission for transmitting drive forces from the engine to the first output member, a second hydrostatic transmission for transmitting drive forces from the engine to the second output member, a first charge pump adapted to be driven by the engine, first conduit means for connecting said first charge pump in fluid communication with said first hydrostatic transmission, a second charge pump adapted to be driven by the engine, second conduit means for connecting said second charge pump in fluid communication with said second hydrostatic transmission, first actuator means for varying the speed at which the first output member is driven by said first hydrostatic transmissions, second actuator means for varying the speed at which the second output member is driven by said second hydrostatic transmission, and means for effecting operation of both said first and second actuator means to reduce the speeds at which both the first and second output members are driven in response to a decrease in the fluid pressure output of either one of said charge pumps.

28. An apparatus comprising a hydrostatic transmission, said hydrostatic transmission including a pump unit, a motor unit adapted to be connected with an output member, and first conduit means for connecting said pump unit in fluid communication with said motor unit, fluid actuator means for varying the effective displacement of at least one of said units of said hydrostatic transmission to vary the speed at which the output member is driven by said motor unit, brake means separate from said hydrostatic transmission and operable between a disengaged condition and an engaged condition in which said brake means is effective to retard movement of a vehicle with which said hydrostatic transmission is associated, and fluid control means for effecting operation of said brake means from the disengaged condition to the engaged condition and for contemporaneously therewith effecting operation of said fluid actuator means to reduce the speed at which the output member is driven by said motor unit.

29. An apparatus as set forth in claim 28 further including valve means for effecting a reduction in the fluid pressure in said first conduit means upon operation of said brake means from the disengaged condition to the engaged condition.

30. An apparatus as set forth in claim 28 further including second conduit means for conducting control fluid pressure to said actuator means, and pressure controller means for varying the control fluid pressure conducted to said actuator means as a function of the extent of operation of said pressure controller means from an initial condition, said actuator means including pressure responsive motor means for effecting a variation in the effective displacement of at least one of said units of said hydrostatic transmission upon a variation in the control fluid pressure conducted to said actuator means, said control means including means for effecting a variation in the control fluid pressure conducted from said pressure controller means to said actuator means upon operation of said brake means from the disengaged condition to the engaged condition.

31. An apparatus as set forth in claim 28 further including second conduit means for conducting control fluid pressure to said actuator means, and pressure controller means for varying the control fluid pressure conducted to said actuator means to vary the speed at which the output member is driven by said motor unit, said pressure controller means being operable from a neutral setting in which said motor unit is substantially ineffective to drive the output member to any one of a plurality of operating settings in each of which said pressure controller means is effective to port a different fluid pressure to said actuator means, said actuator means including pressure responsive means for varying the speed at which the output member is driven by said motor unit as a function of variations in the control fluid pressure conducted to said actuator means, said control means including means for varying the control fluid pressure ported to said actuator means while maintaining the setting of said pressure controller means substantially constant to effect a reduction in the speed at which said output member is driven upon actuation of said brake means to the engaged condition without changing the setting of said pressure controller means.

32. An apparatus as set forth in claim 28 further including charge pump means for supplying control fluid under pressure, said control means including pressure responsive means for varying the control fluid pressure ported to said actuator means to effect a reduction in the speed at which the output member is driven by said motor unit in response to a decrease in the fluid pressure output of said charge pump means to a pressure which is less than a predetermined pressure.

* * * * *

UNITED STATES PATENT OFFICE
CERTIFICATE OF CORRECTION

Patent No. 3,988,893          Dated November 2, 1976

Inventor(s) Edward J. Bojas et al.

It is certified that error appears in the above-identified patent and that said Letters Patent are hereby corrected as shown below:

| | |
|---|---|
| Col. 5, line 25: | "when" should read ---When---. |
| Col. 7, line 5: | After "When" insert---the---. |
| Col. 9, lines 51-52: | "transmission" should read---transmissions---. |
| Col. 11, line 3: | "ot" should read---to---. |
| line 41: | "wih" should read---with---. |
| Col. 14, line 15: | "vavle" should read ---valve---. |
| line 39: | "dewashing" should read ---deswashing---. |
| Col. 17, line 52: | Delete "from". |
| Col. 18, line 61: | Insert "fluid" after "control". |

Signed and Sealed this

Fifteenth Day of February 1977

[SEAL]

Attest:

RUTH C. MASON
*Attesting Officer*

C. MARSHALL DANN
*Commissioner of Patents and Trademarks*